March 17, 1970 R. MANCEL 3,501,360

METHOD OF MAKING DRY FRICTION MEMBERS

Filed April 19, 1965

INVENTOR
RAYMOND MANCEL
BY
Bacon & Thomas
ATTORNEYS

United States Patent Office 3,501,360
Patented Mar. 17, 1970

3,501,360
METHOD OF MAKING DRY FRICTION MEMBERS
Raymond Mancel, 3 Rue Jules Cloquet, Paris, France
Filed Apr. 19, 1965, Ser. No. 449,139
Claims priority, application France, Apr. 17, 1964, 971,248
Int. Cl. B32b 31/06
U.S. Cl. 156—153
12 Claims

ABSTRACT OF THE DISCLOSURE

A method of manufacturing a dry friction member comprising the steps of taking a metal support member, roughening one surface of the support member, and applying to the roughened surface a layer of Teflon FEP. Then the steps of locating a tissue of graphite over the layer of Teflon FEP to form a multi-layer member, applying heat and pressure to said multi-layer member to impregnate the graphite tissue with the Teflon FEP and bring parts of said graphite tissue into contact with said roughened surface of the metal support member. Finally, cooling the multi-layer member, and lightly machining the exposed surface of the graphite tissue to remove any Teflon FEP appearing on the exposed surface as a result of the impregnation. The invention also includes the dry friction member produced by the method.

---

Figure 1:
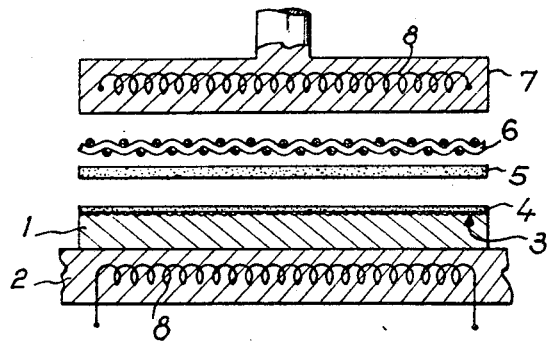

The present invention relates to the manufacture of dry friction members and to the products obtained by this method, the member comprising a metal support, a sheet of a thermoplastics material and a filler material.

Dry friction members are used more and more in all industrial fields where machines and mechanisms are used which exhibit a relative friction between two movable members thereof and which do not permit lubrication by means of liquid or grease, such as for example, certain bearings for shafts, sealed fittings for pumps or jacks, members necessitating a rotary seal such as rotary joints, fittings for fluid distributors and so on.

The use of polytetrafluoroethylene, known under the trademark of Teflon (P.T.F.E.) is already known as a dry lubricating material. However, the characteristics of thermal and electric conductivity do not permit it to be used alone in dry friction members. This is why Teflon has been loaded with metal particles which are intended to transmit heat or electrostatic charges, generally produced during the relative friction, to the Teflon support.

However, such metal particles embedded in the layer of Teflon are practically thermally and electrically insulated from one another, so that for example in a bearing provided with such a friction member, there are always points which overheat because the heat produced by the rotation of the shaft cannot be uniformly distributed throughout the bearing. On the other hand, metal particles may be pulled away from the Teflon layer and may cause friction in the shaft. In order to avoid these disadvantages, it has already been proposed to provide a thicker layer of Teflon so that the metal particles may be well embedded therein. But this further increases the thermal and electric resistance so that the Teflon rapidly heats up and begins to flow under the effect of the load of the shaft, which then produces an inadmissable clearance between the bearing and the shaft. Moreover, the method of manufacturing such dry friction members is very difficult, costly and complicated. In order to obtain acceptable results, the grain size of the particles must be properly suited to each particular use. Then it is necessary to make sure that these particles are uniformly distributed in the bulk of the Teflon. Other difficulties also arise, which are too numerous to mention here. It is an object of the present invention to obviate or minimise the above-mentioned disadvantages. A further object of the invention is a method of manufacturing a dry friction member which has a very good thermal and electrical conductivity, and which can resist the continuously applied shocks and heavy loads.

Accordingly, the invention consists in a method of manufacturing a dry friction member, said method comprising the steps of taking a metal support member, roughening one surface of said support member, applying to said roughened surface a layer of a copolymer of tetrafluorethylene and of hexafluoropropylene known under the trademark of Teflon FEP, locating a tissue of graphite over said layer of Teflon FEP to form a multi-layer member applying heat and pressure to said multi-layer member to impregnate said graphite tissue into the Teflon FEP and bring parts of said graphite tissue into contact with said roughened surface of said metal support member, cooling said multi-layer member, and lightly machining the exposed surface of said graphite tissue to remove any Teflon FEP appearing on said exposed surface as a result of said impregnation.

In one embodiment of the invention, one of the surfaces of the metal support is subjected to a sandblasting operation so as to obtain at least a microrugosity of said surface, and a very thin layer of Teflon FEP in dispersion in distilled water or in other volatile solutions is deposited by means of a spray gun on the surface thus treated, the solution is then evaporated so as to obtain a micro-layer of Teflon FEP, then a sheet of Teflon FEP is deposited on the metal support provided with the micro-layer of Teflon FEP and a graphite tissue is placed on the sheet of Teflon FEP. This assembly of metal support, a micro layer, and the tissue is brought to a temperature which is slightly greater than the melting point of the Teflon FEP and, while this temperature is maintained, a suitable pressure is applied to the graphite tissue so as completely to impregnate the graphite tissue by the Teflon FEP and to bring the graphite tissue into contact with the metal surface of the support, then after this assembly has cooled, a small thickness of the graphite tissue is removed by machining in order to eliminate any covering of the tissue by the Teflon FEP.

In another embodiment of the invention, having subjected the metal support to a sand blasting operation to give one of its surfaces at least a micro-rugosity, firstly a graphite tissue, then a sheet of Teflon FEP is deposited on the treated surface, this assembly is then brought to a temperature which is slightly greater than the melting point of the Teflon FEP and, while this temperature is maintained, this assembly is then subjected to a suitable pressure so as to cause the Teflon FEP completely to penetrate into the pores of the graphite tissue and so as to bring the graphite tissue as well as the Teflon FEP into contact with the treated surface of the metal support. After this assembly has been cooled, a small thickness of the graphite tissue is removed by machining in order to eliminate a possible covering of the tissue by the Teflon FEP.

The temperature to which the assembly constituting the dry friction member is brought, is preferably between 290 and 320° C.

The pressure to which said assembly is subjected is preferably between 50 and 500 kg./cm.$^2$.

The quantity of the Teflon FEP is selected as a function of the volume of the pores of the graphite tissue so that the volume of the Teflon FEP is always slightly greater than that of the pores of the graphite tissue in the non-compressed state.

The dry friction member obtained by the method according to the invention is constituted by a metal support, one of the surfaces of which presents at least a micro-rugosity, by a graphite tissue and by Teflon FEP.

One of the faces of the graphite tissue is in intimate contact with the treated surface of the metal support at least in the areas of the mesh of the tissue, whilst the other face of the tissue may also appear in the areas of the mesh.

The Teflon FEP fills only the pores of the graphite tissue, adheres only at distributed points to the treated surface of the metal support, and holds the graphite tissue applied against said surface.

The total thickness of graphite tissue applied to the metal support is of the order of 2/10 mm.

The metal support may be in the form of a plate, belt or sheet.

Figure 2:
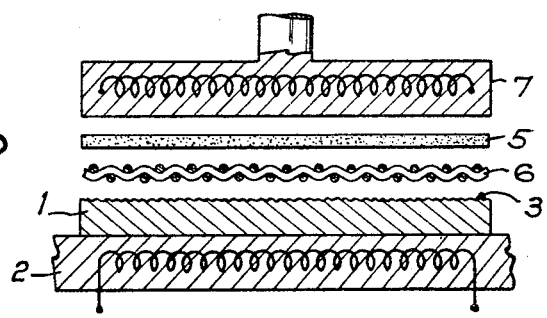
Figure 3:
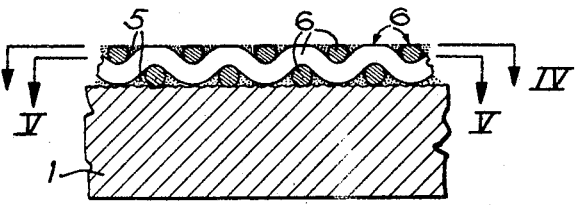
Figure 4:
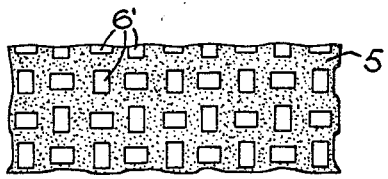
Figure 5:
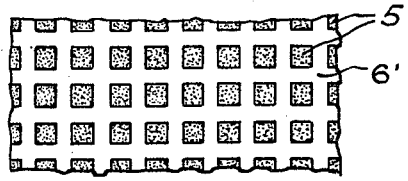

In order that the invention may be more clearly understood, reference will now be made to the accompanying drawings which show two embodiments of the method of manufacture and of the dry friction member thus obtained, by way of example and in which:

FIGURE 1 shows schematically in section, the different phases of operation of a first embodiment of the method, FIGURE 2 similarly shows the different phases of operating a second embodiment, FIGURE 3 shows a vertical section through a dry friction member obtained by said method, FIGURE 4 shows a plan view of one part of the dry friction member along IV—IV of FIGURE 3 and, FIGURE 5 shows a section in plan view of the member along the line V—V of FIGURE 3.

Referring now to the drawings in FIGURE 1, a metal support 1, such as a plate, belt or sheet is shown which is placed on a work table 2 which may be heated. The surface 3 of the metal support 1 has been previously treated by sand blasting, and chemical or electrolytic cleaning, so as to give it at least a micro-rugosity. This micro-rugosity surface 3 is then covered, for example by means of a spray gun, with a very thin layer of Teflon FEP in dispersion in distilled water or in other volatile products so that after the solution has evaporated, a micro-layer of Teflon FEP is obtained having a thickness of the order of 1/100 of a millimeter.

The Teflon FEP is a copolymer of tetra-fluorethylene and of hexafluoropropylene and has all the chemical, electrical and thermal properties of the tetrafluorethylene resins (TFE) as well as the characteristic physical properties of the compounds of chemical structure saturated with fluorine.

On this micro-layer 4 is deposited a film 5 of Teflon FEP having a thickness of 2/10 to 9/10 of a millimeter. Then a graphite tissue 6 is placed above the film 5 which tissue has for example a thickness between 20/100 and 50/100 of a millimeter and preferably between 25/100 and 40/100 of a millimeter. This tissue is very supple and pliable and is a very good conductor of electricity and heat. This stacked assembly 1, 3, 4, 5, 6 is heated to a temperature which is slightly greater than the melting point of the Teflon FEP which is of the order of 290° C. When the Teflon FEP has been brought to a temperature, preferably between 290 and 320° C., this assembly 3 to 6 is compressed by means of a pressure platen 7. Heating means 8 may be incorporated in the platen and/or in the work table 2, and if desired the table 2 and the platen 7 may be especially shaped so as to form a mould.

The pressure of the platen 7 exerted on the tissue 6, the film 5, the micro-layer 4 and the support 1 is preferably at least 5,000 kg./cm.² Because Teflon FEP is in a molten state or at least in a paste-like state at the above-mentioned temperature, the graphite tissue 6 may come directly into contact with the rough metal surface 3 under the effect of the pressure applied by the platen 7. The Teflon FEP of the film 5 and that of the micro-layer 4 also come onto contact together and penetrate into the pores of the graphite tissue 6. The total quantity of the Teflon FEP utilised is determined so that, during the compression operation, the Teflon FEP completely fills the pores of the graphite tissue 6 without preventing the latter from coming into direct intimate contact with the rough surface 3 of the support 1. Any excess of Teflon FEP escapes over the side edges of the support 1. While the Teflon FEP is penetrating into the pores of the tissue 6, the air which is previously located therein is driven upwards.

After this assembly 1, 3, 5, 4, 6 has cooled under pressure, the surface of the friction member thus obtained is lightly machined in order to remove any covering of Teflon FEP on the upper face of the graphite tissue 6 and in order to exhibit relatively large graphite areas on this face.

According to a second embodiment of the method, shown diagrammatically in FIGURE 2, a graphite tissue 6 is directly deposited on the micro-rugose or rough surface 3 of the metal support 1. Then, the film 5 of the Teflon FEP is placed above the graphite tissue 6. This assembly is then brought to a suitable temperature of the order of 290 to 320° C. and compressed by means of the platen 7. The air contained in the pores of the tissue 6 escapes along the rough surface 3 while the softened Teflon FEP, penetrating through the pores of the graphite tissue 6 then comes into contact with the surface 3. It may be advantageous to effect the heating and compression operations in an enclosure where there is a suitable vacuum. In this case, the amount of the utilised Teflon FEP is determined as a function of the volume of the pores of the tissue 6, the weft and warp threads also come into direct contact with the rough surface 3, where, after the assembly 1, 5, 6 has cooled under pressure, they are firmly held by the Teflon FEP anchored on the one hand in the hollows of the surface 3 and on the other hand in the pores of the tissue 6.

The removal by machining of a very thin layer of the surface from the friction member thus effected shows relatively large multiple areas of graphite tissue 6.

As will be apparent from FIGURE 3 showing a partial section on a larger scale of the dry friction member thus produced, there exists numerous points or areas of direct contact between the tissue 6 and the metal support 1. The bulk 5 of Teflon FEP is then located in the interstices between the weft and warp threads of the tissue 6.

According to the thickness of the layer removed by the machining from the surface of the friction member, the patterns shown in FIGURES 4 and 5 are obtained.

In FIGURE 4, only the threads of the tissue 6 and the bulk of Teflon FEP are located in the plane IV—IV of FIGURE 3. However, the different areas 6' of the tissue 6 are always connected below the bulk 5 of Teflon FEP to the adjacent areas. When the surface of the friction member is machined even more, for example up to the plane V—V of FIGURE 3, the pattern of the surface of said friction member presents the form of a grid constituted by the graphite threads 6' and in the interstices of which is located the bulk 5 of Teflon FEP.

It therefore results from these considerations that on the surface of the friction member there also exists a large number of areas which the graphite lightly touches, so that the heat or electric charges produced on this surface by the relative displacement of any member with respect to the friction member may easily be removed from this surface and may be transmitted to the metal support 1 which is connected to cooling elements.

It may thus be seen that, due to the method according to the invention, dry friction members may be manufactured, which, in addition to their lubricating properties have very high and almost isotropic electrical and thermal conductivities.

If for example a friction member according to the invention is used in a plain bearing, the load applied on the bearing may be considerably increased compared with loads applicable up to the present time, when for example a friction member constituted by Teflon loaded with metal particles is used. It is known that the friction area between the surface of the friction member and the shaft must also be as close as possible to the metal support. However, the minimum admissable thickness of the layer of Teflon loaded with metal particles is of the order of 5/10 of a millimeter. This layer thickness is very difficult to produce with the known methods, and, moreover, the particles of the Teflon layer are very frequently broken off and the latter is extruded.

When a friction member manufactured according to the method according to the invention is used, friction layers may easily be produced, the thickness of which is smaller than 2/10 of a millimeter. This result is perfectly comprehensible, when it is known that the initial thickness of the graphite tissue utilised is for example 0.25 millimeter. After the surface of this tissue is compressed and machined in the course of the previously described method of manufacture, a layer constituted by the graphite tissue impregnated with Teflon FEP is easily produced, the total thickness of which tissue is smaller than 0.20 millimeter. Moreover, even at high temperatures, more precisely, higher than the melting point of the Teflon FEP, the latter cannot flow since it is retained in the pores of the graphite tissue. But, in general, even in very severe operating conditions, these temperatures are not reached due to the good conductivity of the graphite tissue and to its numerous areas of contact with the metal support.

By way of examples, several operational conditions will be given to which one of the friction members according to the invention has been subjected.

A shaft bearing was made up provided with a friction member according to the invention, and had an internal diameter of 30 mm. The speed of rotation of the shaft was 30,000 r.p.m., or had a peripheral speed of 47.20 m./sec. The load on the shaft and thus on the bearing, was 1 kg./cm.$^2$. After 300 hours of continuous service, the temperature of the bearing rose only by 10° C. with respect to the ambient temperature. An examination by microscope of the friction member did not show any deterioration.

Of course, the application of the friction members according to the invention is not limited at all to the plain bearings. On the contrary, they may find many uses in all fields in industry, particularly in those mentioned in the introduction hereto, and, more generally, in all cases where there is friction between two members.

I claim:

1. A method of manufacturing a dry friction member, said method comprising the steps of taking a metal support member, roughening one surface of said support member, depositing a micro-layer of a copolymer of tetra-fluoroethylene and hexafluoropropene to the roughened surface, applying to said roughened surface a layer of a copolymer of tetra-fluorethylene and of hexafluoropropene, locating a tissue of graphite over said layer of copolymer to form a multi-layer member, applying heat and pressure to said multi-layer member to impregnate said graphite tissue with the copolymer and bring parts of said graphite tissue into contact with said roughened surface of said metal support member, cooling said multi-layer member, and lightly machining the exposed surface of said graphite tissue to remove any of the copolymer appearing on said exposed surface as a result of said impregnation.

2. A method of manufacturing a dry friction member, said method comprising the steps of taking a metal support member, subjecting one of the surfaces of said metal support to a sand blasting operation as to obtain at least a micro rugosity thereof, taking a copolymer of tetra-fluoroethylene and hexafluoropropene in dispersion in distilled water or in other volatile solutions, depositing said copolymer by means of a spray gun on said micro-rugose surface, evaporating said dispersion to obtain a micro-layer of the copolymer, depositing a sheet of a copolymer of tetra-fluoroethylene and hexafluoropropene over said micro layer of the copolymer, locating a graphite tissue over said sheet of the copolymer to form an assembly, bringing said assembly to a temperature which is slightly greater than the melting point of the copolymer, maintaining said temperature for a time during which pressure is applied to said graphite tissue completely to impregnate said graphite tissue by said copolymer and to bring said graphite tissue into contact with the metal surface of said support member, cooling said compressed assembly and removing a small amount of said graphite tissue by machining to remove any of the copolymer passed through said tissue by said impregnation.

3. The method according to claim 2 wherein the temperature to which said assembly is brought, is between 290 and 320° C.

4. The method according to claim 2, wherein the pressure to which said assembly is subjected is between 50 and 500 kg./cm.$^2$.

5. The method according to claim 2, wherein the quantity of the copolymer utilized is selected as a function of the volume of the pores of the graphite tissue so that the volume of the copolymer is always slightly greater than that of the pores of the graphite tissue in the non-compressed state.

6. The method according to claim 2, wherein said assembly is heated and compressed in an enclosure under vacuum.

7. A method of manufacturing a dry friction member said method comprising the steps of taking a metal support member, sand blasting one surface of said support member to impart thereto at least a micro-rugosity, depositing a micro-layer of a copolymer of tetra-fluoroethylene and hexafluoropropene to the roughened surface, depositing a graphite tissue over said micro-rugose surface, applying a sheet of a copolymer of tetra-fluoroethylene and hexafluoropropene over said tissue to form an assembly, bringing said assembly to a temperature which is slightly greater that the melting point of the copolymer, maintaining said temperature for a time during which said assembly is subjected to a pressure to cause said copolymer completely to penetrate into the pores of said graphite tissue and to bring said graphite tissue as well as the copolymer into contact with the treated surface of said metal support, cooling said assembly, and removing a small thickness of said graphite tissue by machining in order to remove any of the copolymer passed through said tissue as a result of said impregnations.

8. The method according to claim 7 wherein the temperature to which said assembly is brought, is between 290 and 320°.

9. The method according to claim 7, wherein the pressure to which said assembly is subjected is between 50 and 500 kg./cm.$^2$.

10. The method according to claim 7, wherein the quantity of the copolymer utilized is selected as a function of the volume of the pores of the graphite tissue so that the volume of the copolymer is always slightly greater than that of the pores of the graphite tissue in the non-compressed state.

11. The method according to claim 7, wherein said assembly is heated and compressed in an enclosure under vacuum.

12. A method of manufacturing a dry friction member, said method comprising the steps of taking a metal support member, roughening one surface of said metal support member, applying a graphite tissue and a micro-layer of a copolymer of tetra-fluoroethylene and hexafluoropropene and at least one additional layer of said copolymer over said roughened surface to form an assembly, heating said assembly under pressure to impregnate said graphite tissue with some of said copolymer, cooling said compressed assembly and removing any of said copolymer appearing on the exposed face of said graphite tissue after said impregnation.

References Cited

UNITED STATES PATENTS 2,989,433  6/1961  Yuan.
3,108,018  10/1963  Lewis _____ 308—238 X ROBERT F. BURNETT, Primary Examiner R. L. MAY, Assistant Examiner U.S. Cl. X.R.

117—8, 132; 156—285; 161—189, 92; 264—112, 127; 287—90; 308—238